July 30, 1968     D. R. MORRISON ET AL     3,395,374
VOLTAGE TRANSIENT SUPPRESSOR FOR COILS
Filed Aug. 8, 1966
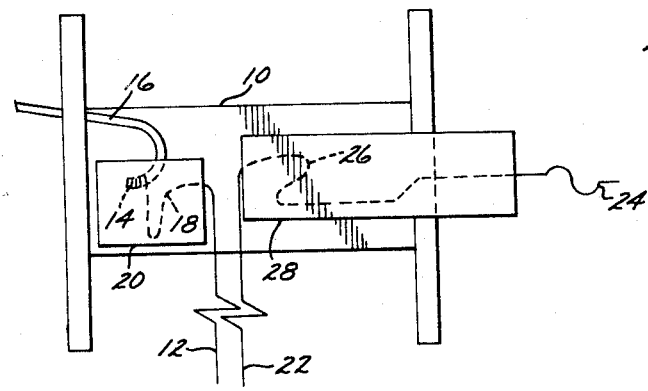
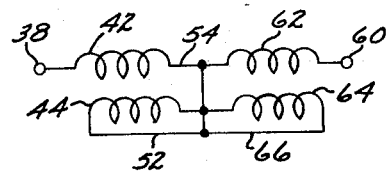
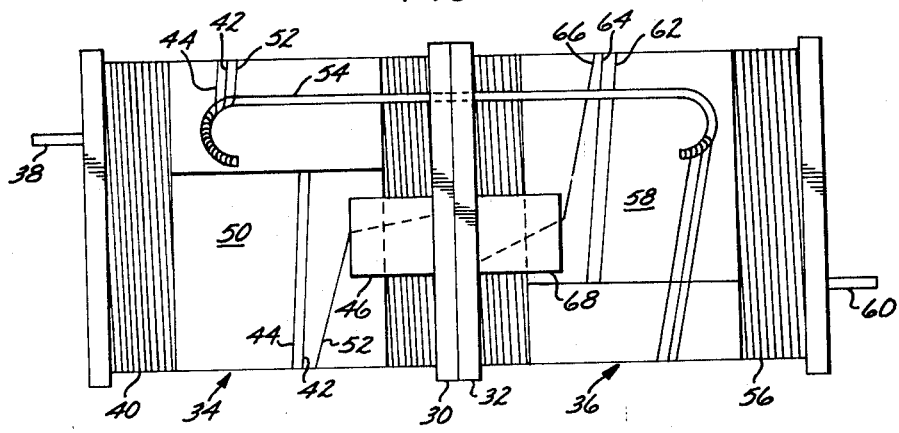
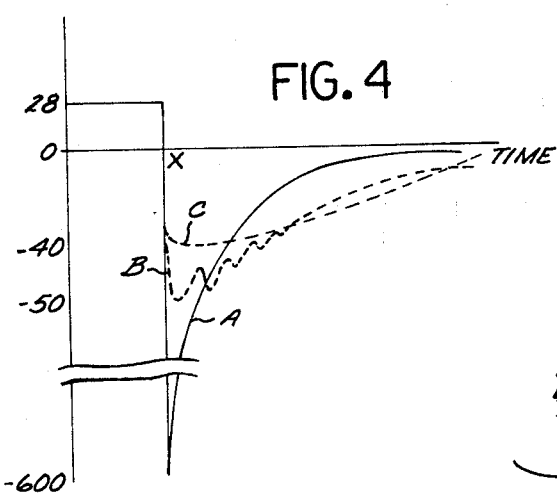
INVENTORS
DONALD R. MORRISON
MICHAEL MULLER
BY
ATTORNEY

United States Patent Office

3,395,374
Patented July 30, 1968

1

3,395,374
VOLTAGE TRANSIENT SUPPRESSOR FOR COILS
Donald R. Morrison, Los Alamitos, and Michael Muller, Newport Beach, Calif., assignors to Babcock Electronics Corporation, Costa Mesa, Calif., a corporation of California
Filed Aug. 8, 1966, Ser. No. 570,983
3 Claims. (Cl. 336—70)

ABSTRACT OF THE DISCLOSURE

This invention relates to electrical coils having means for suppressing the voltage transient generated when current to the coil is interrupted. The embodiment of the invention selected for detailed description comprises a coil assembly including two cores placed end-to-end and upon which are wound bifilar windings—one on each core. One conductor of the bifilar winding on each core is designated as the primary winding and the two primary windings are interconnected to form a single, center tapped primary. The other conductor of the bifilar winding on each core has its ends interconnected so that the winding is short circuited. Adjacent ends of the two secondary windings are interconnected to one another and to the center tap of the composite primary winding.

---

This invention relates to electrical coils having means for suppressing the voltage transient generated when current to the coil is interrupted. As described by Lenz's law, a counter-electromotive force is generated in an electrical coil the magnitude of which is proportional to the inductance of the coil and the rate of change of current flow in the coil. The counter-voltage can rise to values many times the normal voltage across the coil, making heavier insulation necessary, or it can result in arcing at the contacts by which the coil current is interrupted.

The use of a short circuited secondary winding on such coils has long been known to aid in minimizing the voltage transient by providing a continuous path in which the magnetic energy in the coil field can be converted to electricity and dissipated. To insure complete linkage of the secondary winding by flux lines generated by the primary, prior coils have used bifilar windings in which one conductor is short-circuited and serves as the transient suppressing secondary winding.

This invention utilizes the secondary winding, as does the prior art to provide a path for dissipating energy from the field of the primary winding when current is interrupted. In addition, it enjoys capacitive coupling between the turns of the primary and secondary windings and an electrical connection from a point in the secondary to a point in the primary winding to form an additional path for the dissipation of that energy. The added path presents low impedance especially to high frequency currents whereby it tends to suppress radio frequency interference and "hash" that may be an incident to switching the primary coil circuit.

While the primary and secondary windings of a coil may have good magnetic coupling and poor electrostatic coupling, it is not difficult to arrange the windings so that both the inductive and capacitive coupling are good whereby the advantages of the invention are achieved at nominal expense by merely connecting some point in the secondary to some point in the primary winding. In a preferred form of the invention the ends of the secondary are connected to one another and to one end of the primary. Also in the preferred form the primary and secondary are wound together in a bifilar coil.

An especially useful coil, for relays in particular, is formed by connecting two such bifilar coils together in series so that there is a single primary connected at or near its midpoint to two short-circuited secondary windings. Such a coil has been selected as the preferred embodiment of the invention whose detailed description follows and which is illustrated in the accompanying drawings. It is to be understood, however, that various modifications may be made in the embodiment shown and that other embodiments are possible within the scope and spirit of the appended claims.

In the drawings:
FIGURE 1 is a view in side elevation of a coil in a beginning stage of construction;
FIGURE 2 is a circuit diagram of a coil embodying the invention;
FIGURE 3 is a view in side elevation of a coil embodying the invention and in a latter stage of construction; and
FIGURE 4 is a graph of voltage against time representing typical conditions in coils which embody the invention and in coils which do not.

Like reference characters indicate corresponding parts throughout the several views of the drawings.

In FIGURE 1 the coil is shown arranged with its primary and secondary conductors fixed with tape to a coil form 10. The form comprises a rectangular tube of insulating material having a flange of insulating material to each end. The primary conductor 12 has one end wrapped around and soldered to the inner, hooked end 14 of an end terminal of connector 16 which lies flat against the tube and extends through the end flange to form an external soldering lead. The primary conductor 12 is shaped, adjacent its connection at 14 with the end terminal, into a slack loop 18. The slack loop and hooked end 14 of the end terminal are secured in place flat against the core 10 by a patch of tape 20. The secondary conductor 22 is placed flat against the tube of the core at some distance from the inner end 24 of the conductor 22 such that end 24 extends free beyond the end of the core as shown. Adjacent the core tube the secondary conductor 22 is formed into a slack loop 26 and it is held fixed to the core by a strip of tape 28. The tape strip 28 extends along the tube and up the inner side of the flange and then over the flange and off a short distance to the right in FIGURE 1. The standing parts of the two conductors extend in parallel from the core ready for winding together.

The two conductors 12 and 22 are wound in the same direction and are held together during winding which gives the finished coil its bifilar character. Layer after layer of turns are added until the core is filled as shown in FIGURE 3.

The coil of FIGURE 3 is shown complete except that its final insulating and protective covering of tape has been omitted for the sake of clarity and to better show the construction of the coil. It comprises two cores 30 and 32 which are like the core 10 of FIGURE 1 except that they are arranged end-to-end and secured together at their abutting flanges by a suitable means, not shown, such, for example, as an adhesive substance. Each half, 34 and 36 respectively, of the completed coil assembly is substantially like the other and both have windings commencing and secured to their cores as are the windings of FIGURE 1.

Thus coil half 34 comprises core 30 like core 10, an end terminal 38 similar to end terminal 16, a bifilar winding 40 comprising a primary conductor 42 and a secondary conductor 44 like conductors 12 and 22 of FIGURE 1, and a tape strip 46 similar to strip 28 of FIGURE 1. When the bifilar coil is complete it is secured with a wrap of tape 50. Then the inner end 52 of conductor 44, which corresponds to the inner end 24 of secondary conductor 22 in FIGURE 1, is formed over coil 40 and tape 50 and is secured in place by the end of tape strip 46 the latter having adhesive on both sides or, alternatively, being held down by a supplemental piece of tape not shown.

The outer ends of conductors 42 and 44 are wrapped through tape 50 together and are joined by the inner end 52 of secondary conductor 44. The three wires are wrapped in parallel around the coil half to a connection with an interconnecting lead 54. This lead 54 advantageously comprises a heavy wire extending through matching holes in the abutting flanges of cores 30 and 32 and overlying winding 40 and tape 50 of coil half 34 and the corresponding winding 56 and tape 58 of coil half 36. The ends of the connector lead 54 are bent into hooks and wires 42, 44 and 52 are wrapped around and soldered to the hooked end of lead 54 associated with coil half 34.

Coil half 36 is substantially like coil half 34. In addition to core 32, bifilar winding 56 and tape 58 which correspond respectively to core 30, winding 40 and tape 50 of coil half 34, the coil half 36 comprises an end connector 60, a primary conductor 67, a secondary conductor 64 having an inner end 66, and a tape strip 68 corresponding respectively to connector 38, conductors 42, 44 and 52, and strip 46 of coil half 34. The interconnecting lead 54 is common to both coil halves.

The construction described results in an electrical arrangement shown schematically in FIGURE 2. Conductors 42 and 62 are connected in series from end connector 38 to end connector 60 by means of interconnecting lead 54. The secondary conductors 44 and 64 are short-circuited by connection of their respective inner ends 52 and 62 with their outer ends to interconnection lead 54. In addition to inductive coupling of the conductors of the bifilar coils their proximity in FIGURE 2 also indicates electrostatic or capacitive coupling.

While the effect of the invention will vary from example to example, its magnitude in one example and its importance is shown in FIGURE 4 where three voltage-against-time graphs are superimposed upon one another. The ordinate axis is scaled in voltage across the primary winding of a coil which is subjected to plus 28 unidirectional volts at times earlier than time X. At time X the coil circuit is opened. The solid line curve A shows that the coil develops 600 counter volts across its ends when the coil circuit is opened. This voltage is decreased exponentially thereafter. In a bifilar coil in which the primary conductor is like the coil that produced curve A and in which the secondary conductor is short-circuited but unconnected to the primary, the transient is greatly reduced as shown by curve B. Curve B has a peak amplitude of about 50 volts. Curve B has an undulating form containing fewer high frequency components than curve A but many more than are present in curve C which depicts the effect of the interconnecting of the primary and secondary windings according to the invention. Not only does curve C contain fewer radio frequency components and less "hash" but the peak amplitude is about 40 volts or twenty percent less than in curve B.

Although we have shown and described certain specific embodiments of our invention, we are fully aware that modifications thereof are possible. Our invention, therefore, is not to be restricted except insofar as is necessitated by the prior art and by the spirit of the appended claims.

We claim:

1. An electrical coil comprising a bifilar winding of two electrical conductors one a primary winding extending between end terminals and the other a secondary winding having its ends connected to one another and to a midpoint in the secondary winding and to a midpoint in the primary winding.

2. An electrical coil assembly comprising two coils each consisting of a bifilar winding of two electrical conductors one a primary winding and the other a secondary winding, said coils being disposed end-to-end with their primary windings connected in series at the junction between them, and the ends of the secondary windings of both coils connected to one another and to said junction.

3. The invention defined in claim 2, in which each of said coil assemblies comprises a core, and a first terminal connector having one end taped to the core and its other end extending from the core; one of said two electrical conductors comprising the primary winding and having one of its ends electrically connected to said taped end of the terminal connector, the other electrical conductor comprising said secondary winding and being taped to said core near one of its ends, said two conductor wires being wound together in the same direction around said core to form said bifilar winding; a second terminal connector having one end taped to said core and its other end extending to and being correspondingly taped to the other core, said conductors, including both ends of the conductor comprising the second winding having electrical connection to one another and to said second terminal connector.

References Cited
UNITED STATES PATENTS

| | | | |
|---|---|---|---|
| 929,256 | 7/1909 | Sink | 323—50 |
| 1,507,190 | 9/1924 | Kress | 336—70 XR |
| 1,641,659 | 9/1927 | Brand | 336—70 XR |
| 1,732,715 | 10/1929 | Dessauer et al. | 336—170 XR |
| 2,929,132 | 3/1960 | Wohlhieter | 336—192 XR |

OTHER REFERENCES

A.P.C. Application of Carpentier, Ser. No. 374,627, pub. May 18, 1943.

LARAMIE E. ASKIN, *Primary Examiner.*

T. J. KOZMA, *Assistant Examiner.*